US012494179B2

(12) United States Patent
Kim et al.

(10) Patent No.: US 12,494,179 B2
(45) Date of Patent: Dec. 9, 2025

(54) BACKLIGHT PIXEL DRIVING CIRCUIT AND DISPLAY DEVICE

(71) Applicant: LX SEMICON CO., LTD., Daejeon (KR)

(72) Inventors: Sang Suk Kim, Daejeon (KR); Ji Hwan Kim, Daejeon (KR); Kyeong Rok Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/768,838

(22) Filed: Jul. 10, 2024

(65) Prior Publication Data

US 2025/0022430 A1 Jan. 16, 2025

(30) Foreign Application Priority Data

Jul. 11, 2023 (KR) ........................ 10-2023-0090069
Jan. 15, 2024 (KR) ........................ 10-2024-0005815

(51) Int. Cl.
*G09G 3/34* (2006.01)

(52) U.S. Cl.
CPC ....... *G09G 3/342* (2013.01); *G09G 2320/064* (2013.01); *G09G 2330/021* (2013.01)

(58) Field of Classification Search
CPC ........... G09G 3/342; G09G 2310/0291; G09G 2330/021; G09G 2320/064; G09G 2320/0646; G09G 3/3426; G09G 2310/08; G09G 3/34
See application file for complete search history.

(56) References Cited

U.S. PATENT DOCUMENTS

| | | | | |
|---|---|---|---|---|
| 11,596,035 | B2 * | 2/2023 | Wang | H02M 3/33507 |
| 2012/0032935 | A1 | 2/2012 | Yen | |
| 2020/0060003 | A1 * | 2/2020 | Wang | H05B 45/10 |
| 2022/0044643 | A1 * | 2/2022 | Gu | G09G 3/32 |
| 2023/0215352 | A1 * | 7/2023 | Kim | G09G 3/2092 345/690 |
| 2023/0298539 | A1 * | 9/2023 | Wang | G09G 3/32 345/520 |

OTHER PUBLICATIONS

The extended European Search Report dated Dec. 13, 2024 issued in Patent Application No. 24187774.5 (11 pages).
Changbyung Park et al., “Low drain voltage S/H type PWM LED current driver for BLU in mobile LCD”, Proceedings of the IEEE 2014 Custom Integrated Circuits Conference, IEEE, Sep. 15, 2014 (Sep. 15, 2014), pp. 1-4, XP32676252A.

* cited by examiner

*Primary Examiner* — Olga V Merkoulova
(74) *Attorney, Agent, or Firm* — POLSINELLI PC

(57) ABSTRACT

A backlight pixel driving circuit includes an interface unit configured to receive dimming data, a storage unit configured to store the received dimming data, a controller configured to drive a backlight pixel based on the dimming data, and an analog circuit block, wherein the controller generates a channel enable signal synchronized with a pulse width modulation signal and controls the on-off of the analog circuit block using the channel enable signal. Accordingly, an effect of reducing current consumption may be further increased as an analog circuit block itself of a light-emitting diode (LED) driving circuit is dynamically turned on and off.

14 Claims, 11 Drawing Sheets

BACKLIGHT PIXEL DRIVING CIRCUIT AND DISPLAY DEVICE

CROSS-REFERENCE TO RELATED APPLICATIONS

This application claims the priority of Korean Patent Application No. 10-2024-0005815, filed on Jan. 15, 2024, which claims the priority of Korean Patent Application No. 10-2023-0090069, filed on Jul. 11, 2023, which are hereby incorporated by reference in its entirety.

BACKGROUND

Field of the Disclosure

The present disclosure relates to a backlight pixel driving circuit, and more specifically, to a backlight pixel driving circuit which controls the on-off of an analog circuit block using a channel enable signal synchronized with a pulse width modulation (PWM) signal.

Description of the Background

As information technology develops, many related technologies have been developed in the field of display devices for displaying visual information as an image or a picture. A display device includes a display panel including a plurality of sub-pixels, a driving circuit which supplies signals for driving the display panel, and a power supply unit which supplies power to the display panel, and the driving circuit includes a gate driving circuit, a data driving circuit, and the like which respectively supply gate signals, data signals, and the like to the display panel.

Meanwhile, a liquid crystal display device which has been widely used as a flat panel display device until recently is a non-luminous display which cannot emit light by itself and requires a light source that supplies light from the outside. A device which supplies light from a back surface of the liquid crystal display device is referred to as a backlight unit (BLU).

A mini light-emitting diode (mini-LED) is a miniaturized LED used in a backlight unit to reduce the disadvantages of LCDs, and since more chips with a smaller size are used compared to an LED driving circuit for LCD operation, a method of reducing the current consumption of an LED driving circuit for driving the backlight pixels of the mini-LED was required. Mini-LED backlight units (mini-LED BLUs) may be classified into pulse width modulation (PWM) and pulse amplitude modulation (PAM) types depending on the driving method, and previously, low-power circuit design was performed for both driving methods to reduce the current consumption of an analog circuit block.

The above information disclosed in this Background section is only for enhancement of understanding of the background of the described technology and therefore it may contain information that does not form prior art that is already known to a person of ordinary skill in the art.

SUMMARY

Accordingly, the present disclosure is directed to a backlight pixel driving circuit and a display device including the same that substantially obviate one or more of problems due to limitations and disadvantages described above.

More specifically, the present disclosure is to provide a backlight pixel driving circuit which further increases an effect of reducing the current consumption of an analog circuit as an analog circuit block itself is dynamically turned on and off.

An aspect of the present disclosure is directed to providing a backlight pixel driving circuit which controls the on-off of an analog circuit block using a channel enable signal synchronized with a pulse width modulation (PWM) signal.

An aspect of the present disclosure is directed to providing a backlight pixel driving circuit which controls the on-off of an analog circuit block using a channel enable signal synchronized with a scan signal.

The present disclosure is not limited to the above-mentioned, and other features which are not mentioned will be clearly understood by those skilled in the art from the following description.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a backlight pixel driving circuit includes an interface unit configured to receive dimming data, a storage unit configured to store the received dimming data, a controller configured to drive a backlight pixel based on the dimming data, and an analog circuit block, wherein the controller generates a channel enable signal synchronized with a pulse width modulation signal and controls the on-off of the analog circuit block using the channel enable signal.

In another aspect of the present disclosure, a backlight pixel driving circuit includes an interface unit configured to receive dimming data, a storage unit configured to store the received dimming data, a controller configured to drive a backlight pixel based on the dimming data, and an analog circuit block, wherein the controller generates a channel enable signal synchronized with a scan signal and controls the on-off of the analog circuit block using the channel enable signal.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will become more apparent to those of ordinary skill in the art by describing exemplary aspects thereof in detail with reference to the accompanying drawings, in which.

DETAILED DESCRIPTION

Figure 1:
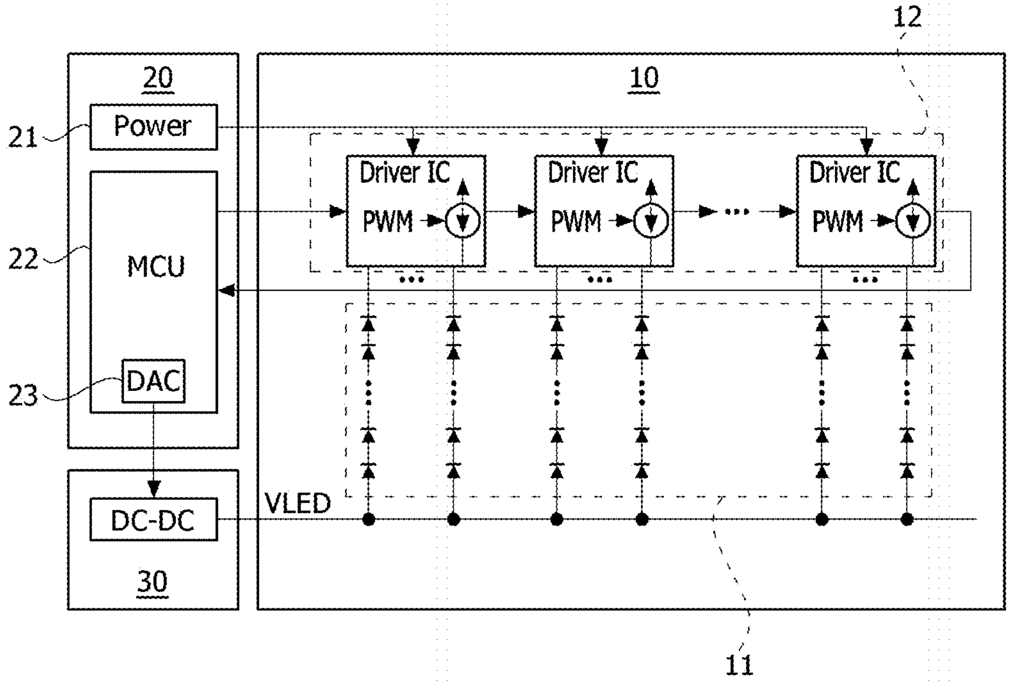
FIG. 1 is a block diagram of a display device according to one aspect of the present disclosure.

Advantages and features of the present disclosure, and methods of achieving them will become apparent with reference to the following aspects, which are described in detail, in conjunction with the accompanying drawings. However, the present disclosure is not limited to the aspects to be described below and may be implemented in various different forms, the aspects are only provided to completely disclose the present disclosure and completely convey the scope of the present disclosure to those skilled in the art, and the present disclosure is defined only by the scope of the claims.

Since the shapes, sizes, proportions, angles, numbers, and the like disclosed in the drawings for describing the aspects of the present disclosure are only exemplary, the present disclosure is not limited to the items shown in the drawings. Throughout the disclosure, the same reference numerals refer to the same components. Further, in describing the present disclosure, when it is determined that a detailed description of related known technology may unnecessarily obscure the gist of the present disclosure, the detailed description thereof will be omitted. When 'providing,' 'including,' 'having,' 'consisting of,' and the like mentioned in the present disclosure are used, other parts may be added unless 'only' is used. A case in which a component is expressed in the singular form includes a case of including the plural form unless explicitly stated otherwise.

In interpreting the components, it should be understood that an error range is included even when there is no separate explicit description.

In a description of a positional relationship, when the positional relationship of two parts such as 'on,' 'at an upper portion,' 'at a lower portion,' or the like is described, one or more other parts may be located between the two parts unless 'immediately' or 'directly' is used.

In a description of a temporal relationship, when the temporal relationship is described as 'after,' in succession to,' 'and then,' 'before,' or the like, non-consecutive cases may also be included unless 'immediately' or 'directly' is used.

'unit' used in the present disclosure is a unit which processes at least one function or operation, and may mean, for example, a software component or hardware component. The function provided in the 'unit' may be performed separately by a plurality of components, or integrated with other additional components. The 'unit' of the present disclosure may be implemented through a single circuit or a plurality of circuits.

Features of various aspects of the present disclosure may be partially or fully coupled or combined with each other, and technically, various types of interconnections and driving are possible, and the aspects may be implemented independently of each other or may be implemented along with each other in a related relationship.

Hereinafter, a backlight pixel driving circuit according to the aspects of the present disclosure will be described with reference to the accompanying drawings.

FIG. 1 is a block diagram of a display device according to one aspect of the present disclosure.

Referring to FIG. 1, the display device includes a light-emitting diode (LED) array board 10, a control device board 20, and a power board 30.

The LED array board 10 includes an LED array 11 in which a plurality of LEDs are connected in series and an LED driving circuit (driver IC) 12 for driving backlight pixels. The plurality of LEDs constituting the LED array 11 may be mini-LEDs, which are miniaturized LEDs for driving backlight pixels. The driving circuit 12 may be a device for controlling the operation of the plurality of LEDs disposed in a backlight (not shown). The driving circuit 12 may control the operation of a switch circuit disposed therein and control the timing or intensity of the driving current transmitted to the LEDs. The driving circuit 12 may change the operation of the LEDs based on control signals received from a microcontroller unit (MCU) 22 through a controller (not shown), or change the operation of the LEDs based on signals received from another driving circuit. If necessary, the driving circuit 12 may change the operation of the LEDs based on an algorithm or information previously stored in a storage unit (not shown).

The control device board 20 includes a power unit 21 which generates a voltage supplied to the driving circuit 12 and a microcontroller unit 22 for controlling the operation of the driving circuit 12. The microcontroller unit 22 may be a device which transmit control signals to the driving circuit 12 to control the driving timing, the driving current, and the driving voltage of the LEDs. A timing controller (not shown) and the microcontroller unit 22 may share some functions, and may be integrally implemented for effective data computation as needed, but are not limited thereto.

The power board 30 generates a VLED voltage supplied to the LED array 11. When a channel output voltage in the driving circuit 12 is detected and falls to a preset voltage or less, the VLED voltage performs a function of applying direct current (DC)-DC control signals to the microcontroller unit 22, and then changing a DC-DC output voltage through a digital-analog converter (DAC) 23 in the microcontroller unit 22 to maintain the brightness of the LEDs at a constant level.

More specifically, the driving circuit 12 may include a digital logic operation unit, a digital-analog converter unit, a dimming controller, a register, and the like.

The digital logic operation unit may generate pulse width modulation (PWM) signals or pulse amplitude modulation (PAM) signals by calculating digital-type serial clock signals SCLK received from the microcontroller unit 22. The digital logic operation unit may have a circuit integrated with or separated from a PWM generation unit to be implemented, but is not limited thereto. The digital logic operation unit may perform logic operations, for example, an AND logic operation, an OR logic operation, and the like and output the results for all or some of serial clock signals SCLK, local dimming signals L/D, PWM clock signals PWMCLK, vertical synchronization signals VSYNC, and enable signals.

The digital-analog converter unit may convert digital-type signals transmitted from the digital logic operation unit into analog-type signals and transmit the analog-type signals to the dimming controller.

The dimming controller may adjust a duty ratio of the PWM signal at a current of a reference current value or less and maintain the duty ratio of the PWM signal at a constant level at a current exceeding the reference current value. The dimming controller may define various hybrid driving conditions using a plurality of reference current values stored in a register.

The register may be a memory-type circuit which stores information related to an operating mode of the driving circuit 12, for example, PWM driving, PAM driving, hybrid driving, or the like or stores information related to the current channels of the driving circuit 12, a driving delay or deviation of the driving circuit 12, or the like.

The driving circuit 12 may include a switch unit, and include one or more current channels CH which are electrically connected to the light-emitting diodes (LEDs) and transmit the driving current of the light-emitting diodes (LEDs). For example, a first driving current ILED1 may be individually generated and controlled through a first channel $CH_1$ and a second driving current ILED2 may be individually generated and controlled through a second channel $CH_2$.

Meanwhile, when mini-LEDs are used to drive the backlight pixels, a reduction in the current consumption of the driving circuit 12 is required. Mini-LED backlight units (mini-LED BLUs) may be typically driven by a pulse width modulation (PWM) method and/or a pulse amplitude modulation (PAM) method, and a solution has been generally sought through a low-power circuit design to reduce the current consumption of the analog circuit block for both driving methods, but it is difficult to increase the efficiency of reducing current consumption. Accordingly, a driving circuit capable of further reducing the current consumption for driving the backlight pixels using mini LEDs will be described below.

Figure 2:
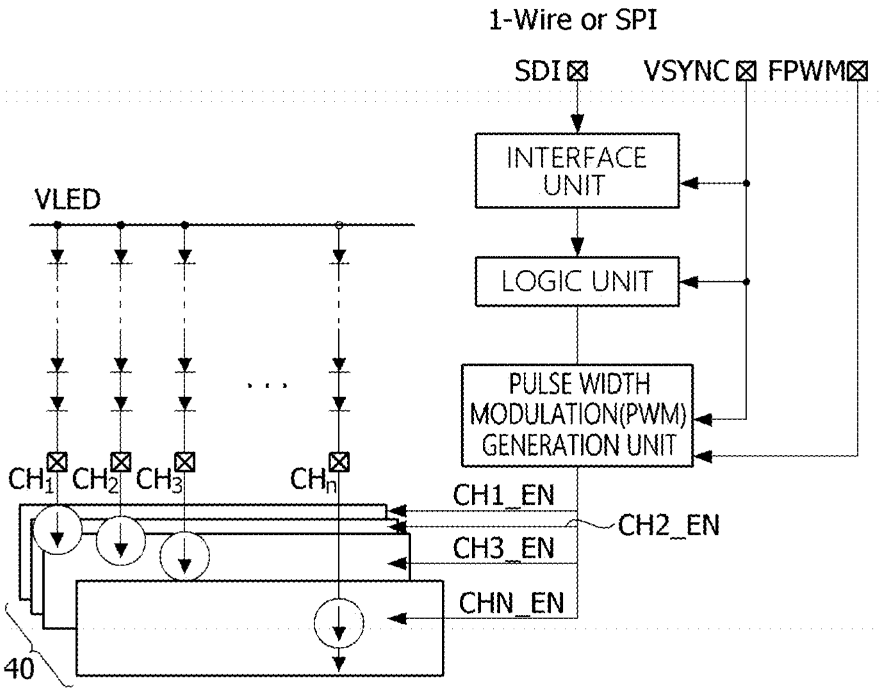
FIG. 2 is a view illustrating a pulse width modulation (PWM) driving method of the display device according to one aspect of the present disclosure.

FIG. 2 is a view illustrating the PWM driving method of the display device according to one aspect of the present disclosure.

The mini-LED backlight units (mini-LED BLUs) may be driven by the pulse width modulation (PWM) method and/or the pulse amplitude modulation (PAM) method, and the PWM method is a method of adjusting the time of current supplied to pixels according to a brightness value of the pixels.

Referring to FIG. 2, a backlight pixel driving circuit of the PWM driving method according to one aspect of the present disclosure may include an interface unit which receives local dimming data, a logic unit which generates a control signal based on the received dimming data, and a PWM generation unit which receives the control signal from the logic unit and generates a PWM signal.

The logic unit may generate channel enable signals CH1_EN, CH2_EN, CH3_EN, . . . , and CHN_EN which respectively control the on-off of channels 40 of the LED array 11, and the channel enable signals may be signals synchronized with a pulse width modulation (PWM) signal.

Figure 3:
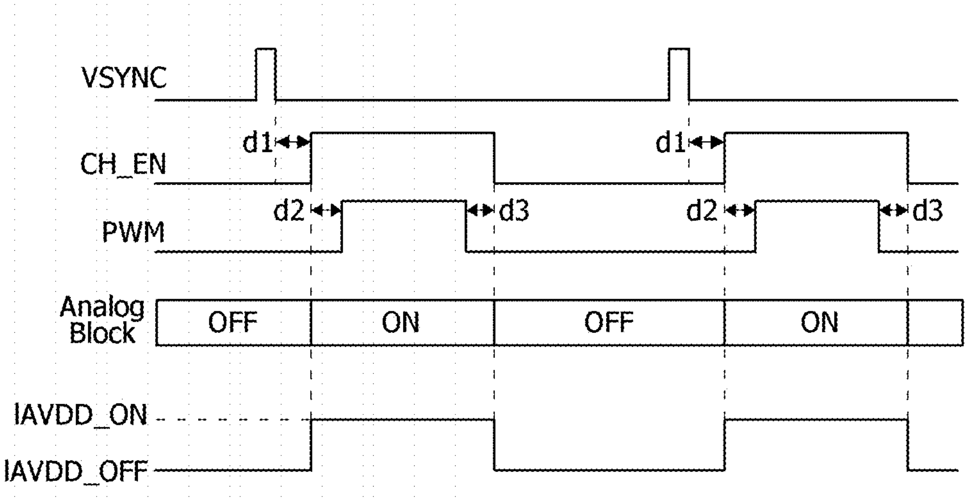
FIG. 3 is a waveform diagram of signals used in the PWM driving method according to one aspect of the present disclosure.

FIG. 3 is a waveform diagram of signals used in the PWM driving method according to one aspect of the present disclosure.

Referring to FIG. 3, the channel enable signal of the backlight pixel driving circuit according to one aspect of the present disclosure is a signal synchronized with a PWM signal, and the on-off of the analog circuit block may be controlled through the channel enable signal. In other words, the operation of the analog circuit block may be activated (on state) or deactivated (off state) through the channel enable signal synchronized with the PWM signal.

As described above, the on-off of the analog circuit block itself including a current mirror unit which generates current and transmits the current to a channel and an amplifier unit which supplies a voltage required for the operation of the current mirror unit may be dynamically controlled through the channel enable signal synchronized with the PWM signal generated by the logic unit, and accordingly, an effect of reducing current consumption may be further increased.

The channel enable signal synchronized with the pulse width modulation (PWM) signal according to one aspect of the present disclosure may be at an on level (that is, pulse-on state) before the PWM signal and may be at an off level (that is, pulse-off state) after the PWM signal. Although the channel enable signal is synchronized with the PWM signal, since a settling time is required for normal operation of the analog circuit, in the PWM driving method, the analog signal should be turned on before the time at which the pulse of the PWM signal is generated in consideration of the channel. Further, the channel enable signal synchronized with the pulse width modulation (PWM) signal according to one aspect of the present disclosure may be at an on level after a vertical synchronization signal VSYNC is at an off level.

FIG. 3 illustrates that channel enable signal CH_EN is at an on level a time d2 before the PWM signal and at an off level a time d3 after the PWM signal, and is at an on level a time d1 after the vertical synchronization signal VSYNC is at an off level. It should be noted that the times d1, d2, and d3 only mean certain time intervals (delay times) to help understanding and do not have specific time values.

Figure 4:
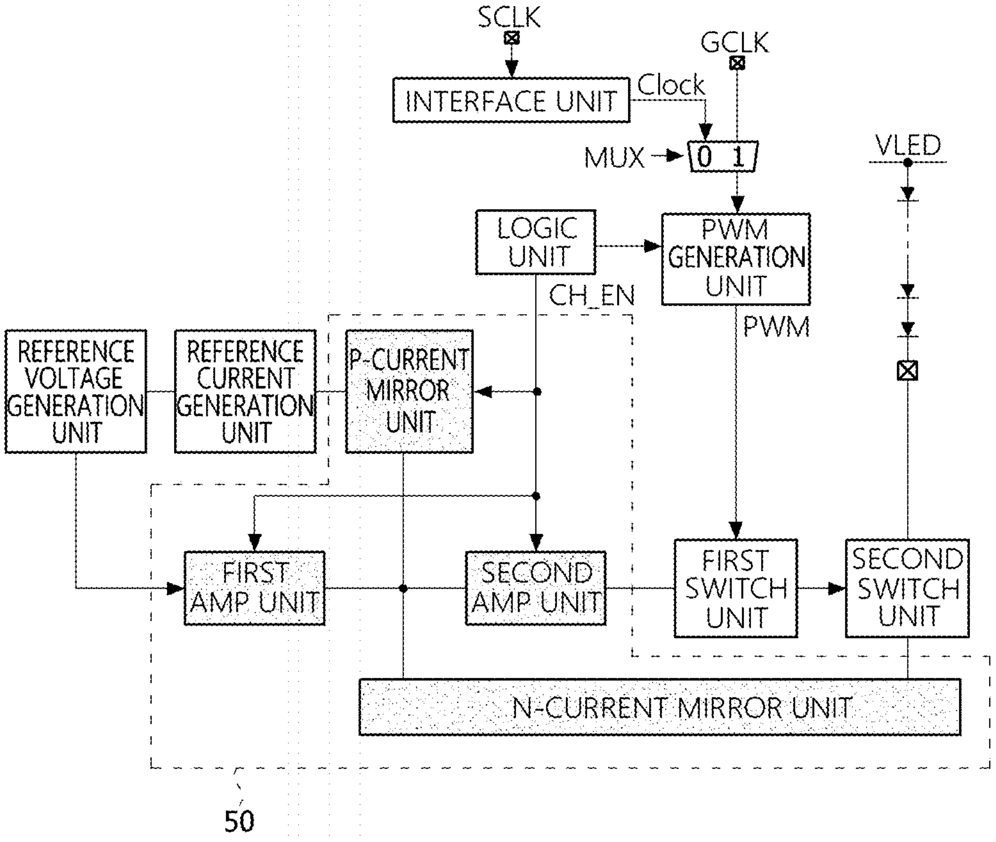
FIG. 4 is a block diagram illustrating a backlight pixel driving circuit of the PWM driving method and the operation thereof according to one aspect of the present disclosure.

FIG. 4 is a block diagram illustrating the backlight pixel driving circuit of the PWM driving method and the operation thereof according to one aspect of the present disclosure.

As described in FIG. 4, the backlight pixel driving circuit of the PWM driving method according to one aspect of the present disclosure may include the interface unit which receives local dimming data, the logic unit which generates a control signal based on the received dimming data, and the PWM generation unit which receives the control signal from the logic unit and generates a PWM signal, and controls the on-off of the analog circuit block through a channel enable signal synchronized with a PWM signal generated by the logic unit.

More specifically, the backlight pixel driving circuit of the PWM driving method may further include a first amplifier (AMP) unit which generates a voltage required to maintain a channel current, a second AMP unit for maintaining the same voltage at both ends of an N-current mirror unit, a first switch unit and a second switch unit for PWM driving, a reference voltage generation unit which generates a reference voltage Vref, a reference current generation unit which converts the generated reference voltage into current to generate a reference current Iref, a P-current mirror unit for generating a channel current from the reference current generation unit, and the N-current mirror unit for transmitting the current from the P-current mirror unit to the channel.

An analog circuit block 50 of the backlight pixel driving circuit of the PWM driving method according to one aspect of the present disclosure may include a current mirror unit which generates current and transmits the current to the channels, and an amplifier unit which supplies the voltage required for the operation of the current mirror unit. The current mirror unit includes a P-current mirror unit for generating a channel current from the reference current generation unit and an N-current mirror unit for transmitting the current from the P-current mirror unit to the channel. The amplifier unit includes a first AMP unit which generates a voltage required to maintain the channel current and a second AMP unit for maintaining the same voltage at both ends of the N-current mirror unit.

Meanwhile, the PWM generation unit may generate the PWM signal through a method of using a PWM clock signal received from an external pin or using a serial clock signal SCLK used in the interface unit, or a method of generating the driving circuit IC itself through an internal oscillator.

Figure 5:
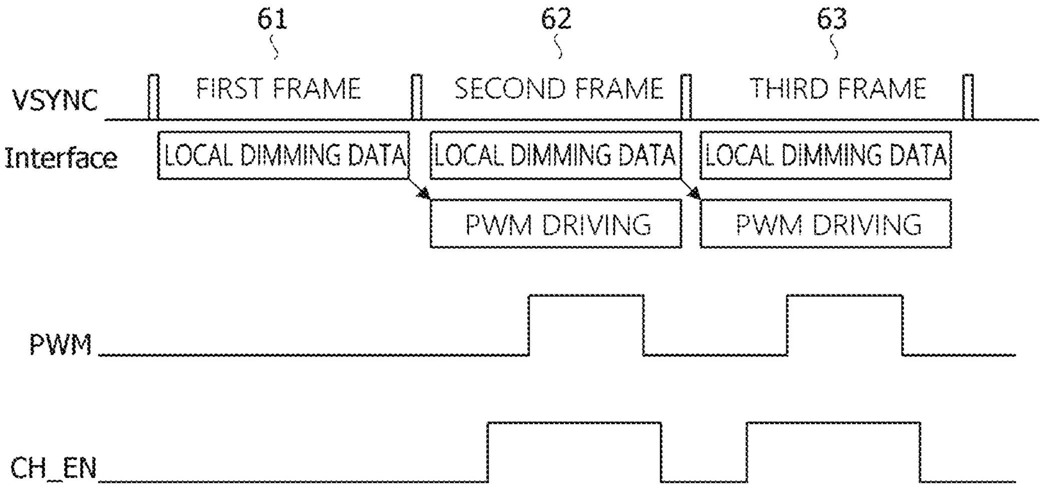
FIG. 5 is a view illustrating a PWM signal generation process in the PWM driving method according to one aspect of the present disclosure.

FIG. 5 is a view illustrating a PWM signal generation process in the PWM driving method according to one aspect of the present disclosure.

In the case of the PWM driving method, local dimming data is received from a previous frame through the interface unit, the received dimming data is stored, and then the backlight pixel driving circuit is driven by applying a duty value and a delay value of the PWM signal in the next frame.

Referring to FIG. 5, for the pulse width modulation (PWM) signal according to one aspect of the present disclosure, the local dimming data is received in a first frame 61, which is the previous frame, through the interface unit, and the duty value and the delay value are determined in a second frame 62, which is the next frame, based on the received dimming data. Likewise, the duty value and the delay value of the PWM signal are determined in a third frame 63, which is the next frame, based on the dimming data received in the second frame 62.

In this way, a channel enable signal synchronized with a PWM signal in which the duty value and the delay value are set is applied to the channel to control the on-off of the analog circuit block. Further, to secure the activation time of the analog circuit block, the channel enable signal may be set to be turned on before the PWM signal and turned off after the PWM signal. In summary, the channel enable signal is synchronized with the PWM signal and are set to be at an on level before the PWM signal and at an off level after the PWM signal.

Figure 6:
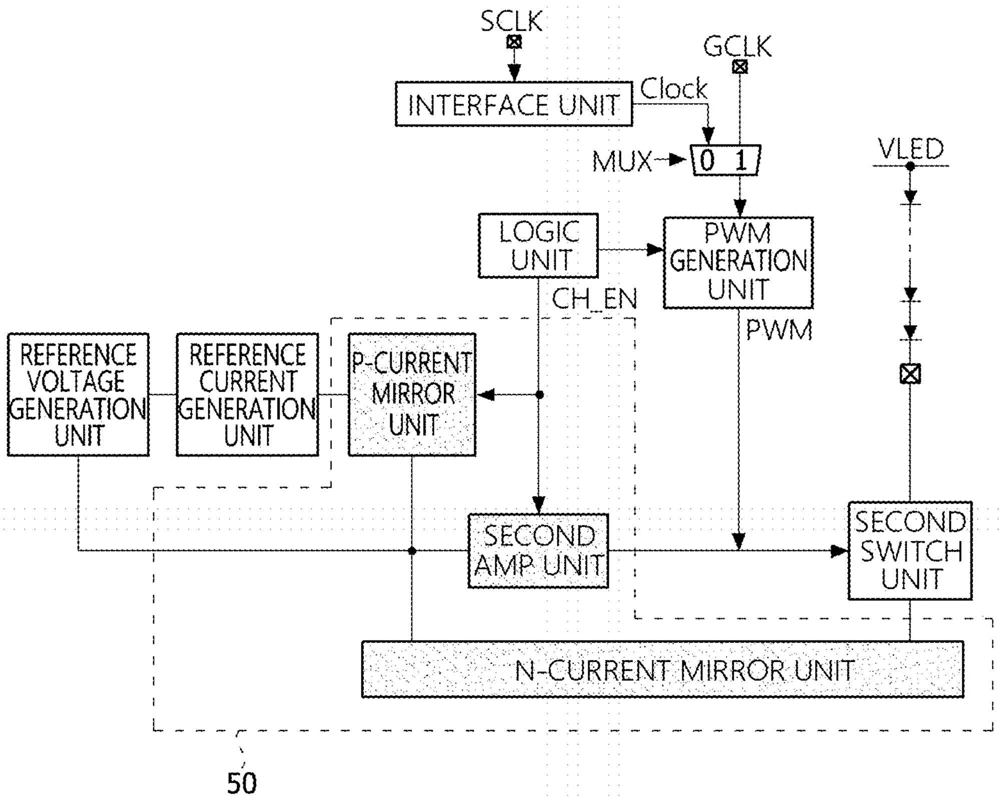
FIG. 6 is a block diagram illustrating a backlight pixel driving circuit of a PWM driving method and the operation thereof according to another aspect of the present disclosure.

FIG. 6 is a block diagram illustrating a backlight pixel driving circuit of a PWM driving method and the operation thereof according to another aspect of the present disclosure.

Since the backlight pixel driving circuit in FIG. 6 is a circuit in which a first AMP unit which generates a voltage required to maintain the channel current and a first switch unit for PWM driving are removed from the driving circuit in FIG. 4, parts overlapping the description in FIG. 4 will be briefly described.

The backlight pixel driving circuit of a PWM driving method according to another aspect of the present disclosure may include an interface unit, a logic unit, and a PWM generation unit like the driving circuit in FIG. 4, and the on-off of an analog circuit block 50 is controlled through a channel enable signal synchronized with the PWM signal generated by the logic unit.

More specifically, like the driving circuit in FIG. 4, the backlight pixel driving circuit of the PWM driving method according to another aspect of the present disclosure includes a second AMP unit, a second switch unit, a reference voltage generation unit, a reference current generation unit, a P-current mirror unit, and an N-current mirror unit, but has a difference in that a reference voltage generated from the reference voltage generation unit is directly used as a voltage for maintaining the channel current.

Thus, the analog circuit block 50 of the backlight pixel driving circuit of the PWM driving method according to another aspect of the present disclosure may include a current mirror unit which generates current and transmits the current to the channel and an amplifier unit which supplies a voltage required for the operation of the current mirror unit, and the current mirror unit includes a P-current mirror unit and an N-current mirror unit. However, in the amplifier unit, the first AMP unit is omitted and only the second AMP unit is included.

Figure 7:
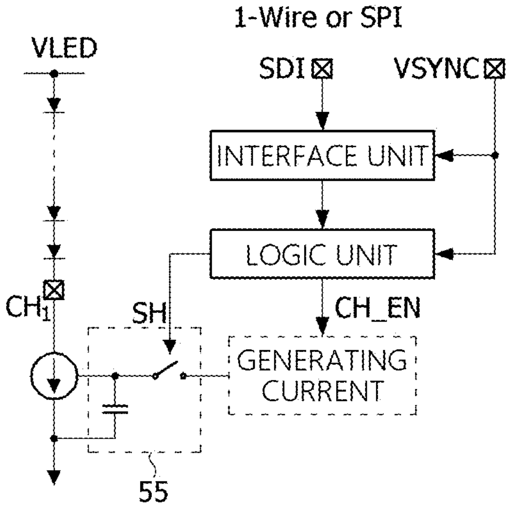
FIG. 7 is a view illustrating a pulse amplitude modulation (PAM) driving method of the display device according to one aspect of the present disclosure.

FIG. 7 is a view illustrating a PAM driving method of the display device according to one aspect of the present disclosure.

Mini-LED backlight units (mini-LED BLUs) may be driven by the pulse width modulation (PWM) method and/or the pulse amplitude modulation (PAM) method, and the PAM method is a method of supplying an analog voltage corresponding to a brightness value of a backlight pixel to the pixel, and adjusting and controlling the magnitude of the current flowing to the pixel according to the analog voltage.

Referring to FIG. 7, the backlight pixel driving circuit of the PAM driving method according to one aspect of the present disclosure may include an interface unit which receives local dimming data, a logic unit which stores the received dimming data in a register and generates a scan signal, which is a control signal, based on the received dimming data, and a sample and hold unit 55 which senses a gate voltage required to generate a channel current.

The logic unit may generate channel enable signals which respectively control the on-off of channels including one channel CH1 of an LED array 11, and the channel enable signals may be signals synchronized with a scan signal.

Figure 8:
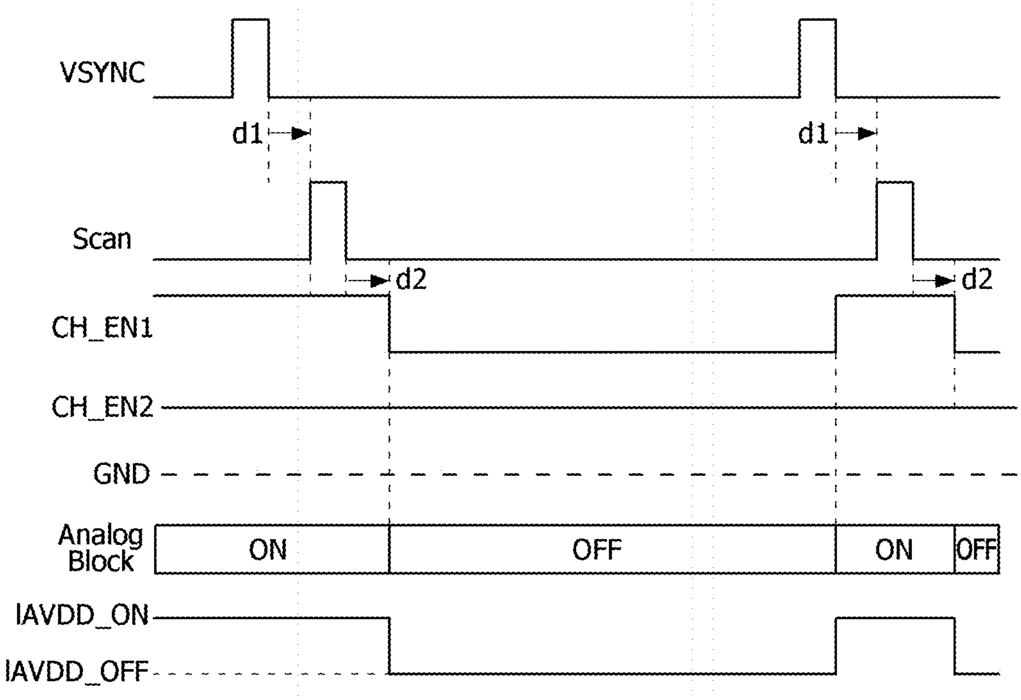
FIG. 8 is a waveform diagram of signals used in the PAM driving method according to one aspect of the present disclosure.

FIG. 8 is a waveform diagram of signals used in the PAM driving method according to one aspect of the present disclosure.

Referring to FIG. 8, the channel enable signal of the backlight pixel driving circuit according to one aspect of the present disclosure is a signal synchronized with the scan signal, and the on-off of the analog circuit block may be controlled through the channel enable signal. In other words, the operation of the analog circuit block may be activated (on state) or deactivated (off state) through the channel enable signal synchronized with the scan signal.

As described above, the on-off of the analog circuit block itself including a current mirror unit which generates current and transmits the current to the channel and an amplifier unit which supplies a voltage required for the operation of the current mirror unit may be dynamically controlled through the channel enable signal synchronized with the scan signal generated by the logic unit, and accordingly, the effect of reducing current consumption may be further increased. In this case, a pulse of the scan signal synchronized with the channel enable signal is generated after a pulse of the vertical synchronization signal VSYNC is generated and a certain time has elapsed.

The channel enable signal synchronized with the scan signal according to one aspect of the present disclosure may be at an on level (that is, pulse-on state) before the scan signal, and may be at an off level (that is, pulse-off state) after the scan signal. Although the channel enable signal is synchronized with the scan signal, since a settling time is required for normal operation of the analog circuit, the analog circuit should be turned on before the scan operation is performed and should be turned off after a certain time has elapsed after the sampling and holding operation is completed.

FIG. 8 illustrates that the scan signal is at an on level a time d1 after the vertical synchronization signal VSYNC is at an off level, and the channel enable signal CH_EN1 is at an on level the time d1 before the scan signal and is at an off level a time d2 after the scan signal (see a pulse at the back end of CH_EN1). It should be noted that the times d1 and d2 only mean certain time intervals (delay times) to help understanding and do not have specific time values. Further, FIG. 8 exemplarily illustrates that the falling edge of the vertical synchronization signal pulse and the rising edge of the channel enable signal pulse occur at the same time, but is not limited thereto, and the rising edge of the channel enable signal pulse may be present between the falling edge of the vertical synchronization signal pulse and the rising edge of the scan signal pulse, and referring to FIG. 11 below, may occur at the same time as the rising edge of the vertical synchronization signal pulse.

Figure 9:
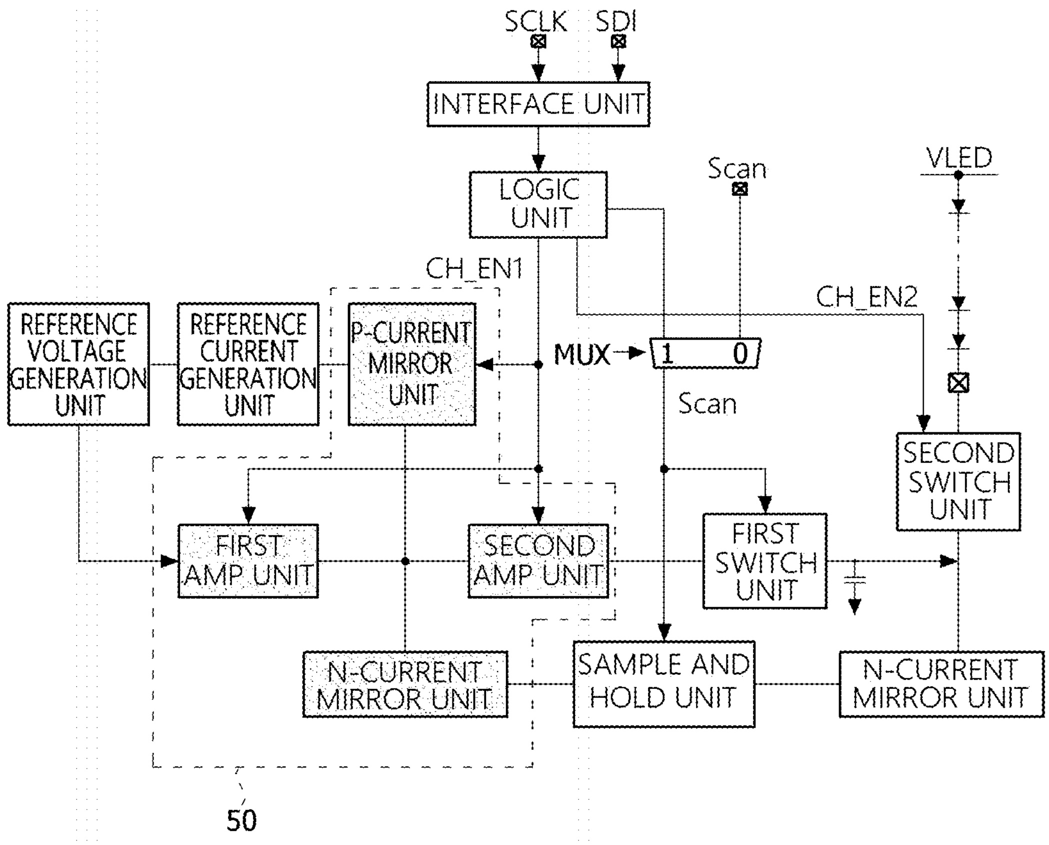
FIG. 9 is a block diagram illustrating a backlight pixel driving circuit of the PAM driving method and the operation thereof according to one aspect of the present disclosure.

FIG. 9 is a block diagram illustrating the backlight pixel driving circuit of the PAM driving method and the operation thereof according to one aspect of the present disclosure.

As shown in FIG. 9, the backlight pixel driving circuit of the PAM driving method according to one aspect of the present disclosure may include the interface unit which receives local dimming data, the logic unit which stores the received dimming data in the register and generates a scan signal, which is a control signal, based on the received dimming data, and the sample and hold unit which senses a gate voltage required to generate a channel current, and the on-off of an analog circuit block 50 is controlled through a channel enable signal synchronized with the scan signal generated by the logic unit.

More specifically, the backlight pixel driving circuit of the PAM driving method may further include a first AMP unit which generates a voltage required to maintain a channel current, a second AMP unit for maintaining the same voltage at both ends of an N-current mirror unit, a first switch unit for maintaining a drain voltage of the N-current mirror unit at a constant level, a second switch unit which performs a function of protecting a circuit against an LED power voltage, a reference voltage generation unit which generates a reference voltage Vref, a reference current generation unit which converts the generated reference voltage into a current to generate a reference current Iref, a P-current mirror unit for generating a channel current from the reference current generation unit, and the N-current mirror unit for transmitting the current from the P-current mirror unit to the channels.

The analog circuit block 50 of the backlight pixel driving circuit of the PAM driving method according to one aspect of the present disclosure may include a current mirror unit which generates current and transmits the current to the channels, and an amplifier unit which supplies a voltage required for the operation of the current mirror unit. The current mirror unit includes a P-current mirror unit for generating a channel current from the reference current generation unit and an N-current mirror unit for transmitting the current from the P-current mirror unit to the channels. The amplifier unit includes a first AMP unit which generates a voltage required to maintain the channel current and a second AMP unit for maintaining the same voltage at both ends of the N-current mirror unit.

Figure 10:
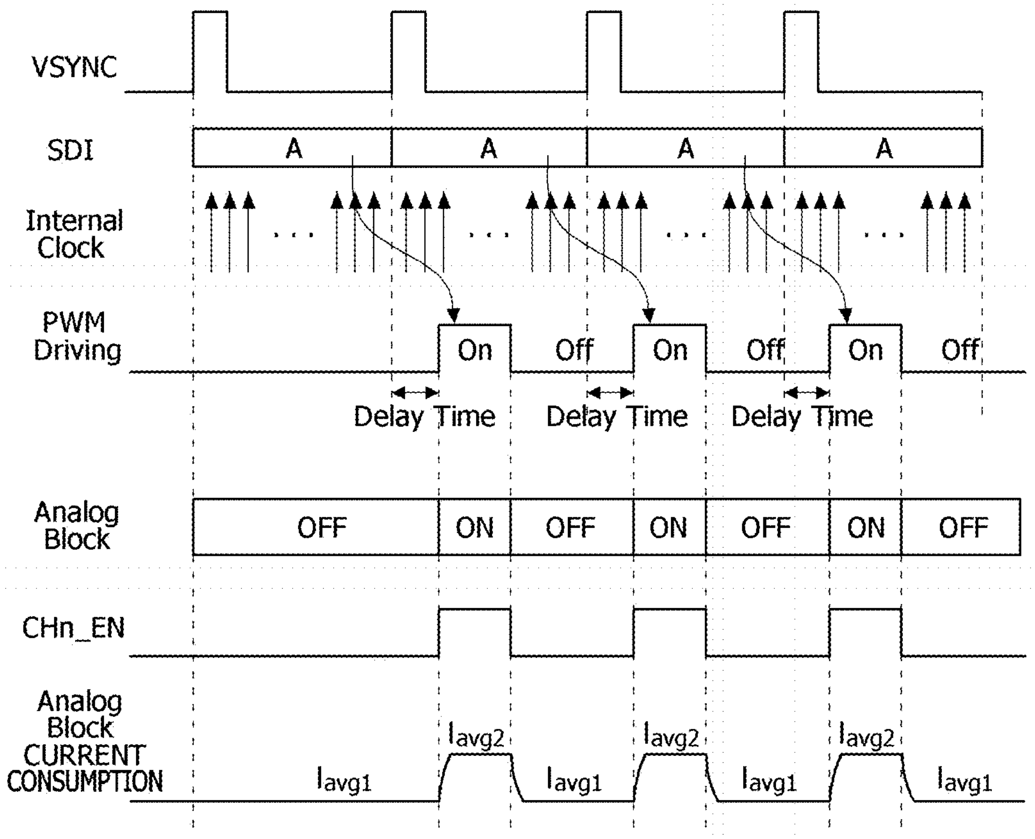
FIG. 10 is a waveform diagram illustrating the signals used in the PWM driving method along with the current consumption of the analog circuit block according to one aspect of the present disclosure.
Figure 11:
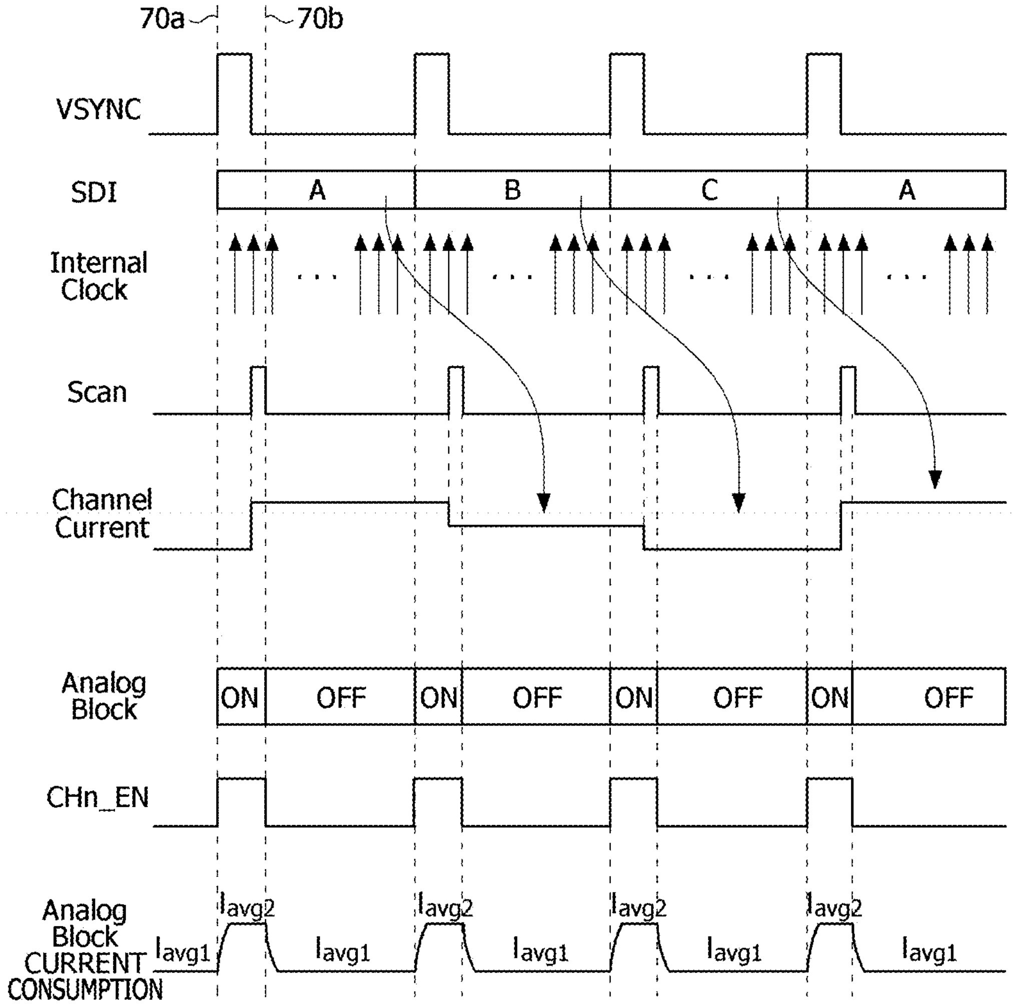
FIG. 11 is a waveform diagram illustrating the signals used in the PAM driving method along with the current consumption of the analog circuit block according to one aspect of the present disclosure.

FIG. 10 is a waveform diagram illustrating the signals used in the PWM driving method along with the current consumption of the analog circuit block according to one aspect of the present disclosure, and FIG. 11 is a waveform diagram illustrating the signals used in the PAM driving method along with the current consumption of the analog circuit block.

Compared to the operation of a conventional backlight pixel driving circuit in which an analog circuit block always maintains an on state during one frame period, referring to FIGS. 10 and 11, an effect of directly reducing current consumption may be acquired as the analog circuit block is controlled in an off state using a channel enable signal synchronized with a PWM signal or scan signal.

Referring to FIG. 10, in the PWM driving method, for example, when a duty ratio of the PWM signal is driven at 50%, the current consumption of the analog circuit block may be reduced in response to 50% which is the duty ratio of the PWM signal, and accordingly, an effect of significantly reducing current consumption may be acquired.

Referring to FIG. 11, the channel enable signal synchronized with the scan signal according to one aspect of the present disclosure may be at an on level when the vertical synchronization signal is at an on level, and may be at an off level after the scan signal is at an off level. As mentioned in FIG. 8, the rising edge of a channel enable signal CHn_EN pulse may occur at the same time as the rising edge 70*a* of the vertical synchronization signal VSYNC pulse. Further, FIG. 11 illustrates that the falling edge of the channel enable signal pulse occurs at the same time as the falling edge 70*b* of the scan signal pulse to help intuitive understanding of signal synchronization, but as described above, since the analog circuit should be turned off after a certain time has elapsed after the sampling and holding operation is completed, the channel enable signal should be turned off after a certain time has elapsed after the scan signal is at the off level (70*b*).

For reference, in FIGS. 10 and 11, SDI (Serial Data Input) is data being supplied from an external circuit, and based on this, the duty ratio of the PWM signal may be determined or the level of the channel current may be determined.

As seen so far, the backlight pixel driving circuit according to one aspect of the present disclosure achieves an advantage in that the effect of reducing current consumption may be further increased as the on-off of the analog circuit block itself in the driving circuit is dynamically controlled using a channel enable signal synchronized with a pulse width modulation signal in the PWM driving method and a channel enable signal synchronized with a scan signal in the PAM driving method depending on the backlight driving method.

According to the aspects of the present disclosure, an effect of reducing current consumption may be further increased as an analog circuit block itself of a light-emitting diode (LED) driving circuit is dynamically turned on and off using a channel enable signal synchronized with a pulse width modulation (PWM) signal or scan signal.

According to the aspects of the present disclosure, as the channel enable signal is turned on before the synchronized PWM signal or scan signal and turned off after the same, it is possible to secure an activation time or deactivation time of the analog circuit block.

According to the aspects of the present disclosure, as the channel enable signal is synchronized with the PWM signal and are turned on in advance and turned off later with a certain time difference, the on-off control of the analog circuit block in relation to control of a PWM signal duty value or the like is possible.

The effects of the present disclosure are not limited to the above-mentioned effects, and other effects which are not mentioned will be clearly understood by those skilled in the art from the above description.

Although the aspects of the present disclosure have been described in more detail with reference to the accompanying drawings, the present disclosure is not necessarily limited to these aspects, and may be variously modified without departing from the technical spirit of the present disclosure. Accordingly, the aspects disclosed in the present disclosure are not intended to limit the technical spirit of the present disclosure, but to describe the technical spirit of the present disclosure, and the scope of the technical spirit of the present disclosure is not limited by these aspects. Accordingly, the above-described aspects should be understood in all respects as illustrative and not restrictive. Thus, it is intended that the present disclosure covers the modifications and variations of the aspects provided they come within the scope of the appended claims and their equivalents.

What is claimed is:

1. A backlight pixel driving circuit comprising:
- an interface circuit configured to receive dimming data;
- a storage circuit configured to store the received dimming data;
- a control circuit configured to drive a backlight pixel based on the dimming data; and
- an analog circuit block,
- wherein the control circuit generates a channel enable signal synchronized with a pulse width modulation signal and controls the on-off of the analog circuit block using the channel enable signal,
- wherein the dimming data is received in a first frame which is a previous frame,
- wherein a duty value and a delay value of the pulse width modulation signal are determined in a second frame which is a next frame based on the dimming data received and stored in the previous frame, and
- wherein the channel enable signal is set to be turned on before the pulse width modulation signal and turned off after the pulse width modulation signal to secure an activation time of the analog circuit block.

2. The backlight pixel driving circuit of claim 1, wherein the channel enable signal becomes an on-level earlier than the pulse width modulation signal and becomes an off-level later than the pulse width modulation signal.

3. The backlight pixel driving circuit of claim 1, wherein the channel enable signal becomes an on-level after a vertical synchronization signal becomes an off-level.

4. The backlight pixel driving circuit of claim 1, wherein the analog circuit block includes:
- a current mirror circuit configured to generate current and transmit the current to a channel; and
- an amplifier circuit configured to supply a voltage required to operate the current mirror circuit.

5. The backlight pixel driving circuit of claim 1, wherein, when the channel enable signal is at an on-level, a channel that supplies a driving current to the backlight pixel and the analog circuit block are turned on, and when the channel enable signal is at an off-level, the channel and the analog circuit block are turned off.

6. A display device comprising:
- a backlight pixel array including backlight pixels that receive a driving current through a channel and emit light;
- a backlight pixel driving circuit configured to control the driving current supplied from the channel; and
- a power circuit configured to supply power which drives the backlight pixel driving circuit,
- wherein the backlight pixel driving circuit is the backlight pixel driving circuit of claim 1.

7. The display device of claim 6, wherein the channel enable signal becomes an on-level earlier than the pulse width modulation signal and becomes an off-level later than the pulse width modulation signal.

8. The display device of claim 6, wherein the channel enable signal becomes an on-level after a vertical synchronization signal becomes an off-level.

9. The display device of claim 6, wherein the analog circuit block includes:
- a current mirror circuit configured to generate current and transmit the current to a channel; and
- an amplifier circuit configured to supply a voltage required to operate the current mirror circuit.

10. The display device of claim 6, wherein, when the channel enable signal is at an on-level, the analog circuit block is turned on, and when the channel enable signal is at an off-level, the analog circuit block is turned off.

11. A backlight pixel driving circuit comprising:
- an interface circuit configured to receive dimming data;
- a storage circuit configured to store the received dimming data;
- a control circuit configured to drive a backlight pixel based on the dimming data; and
- an analog circuit block,
- wherein the control circuit generates a channel enable signal synchronized with a scan signal and controls the on-off of the analog circuit block using the channel enable signal,
- wherein the channel enable signal becomes an on-level earlier than the scan signal and becomes an off-level later than the scan signal, and
- wherein the channel enable signal becomes an on-level when the vertical synchronization signal becomes an on-level and becomes an off-level after the scan signal becomes an off-level.

12. The backlight pixel driving circuit of claim 11, wherein the scan signal becomes an on-level after a vertical synchronization signal becomes an off-level.

13. The backlight pixel driving circuit of claim 11, wherein the analog circuit block includes:
- a current mirror circuit configured to generate current and transmit the current to a channel; and
- an amplifier circuit configured to supply a voltage required to operate the current mirror circuit.

14. The backlight pixel driving circuit of claim 11, wherein, when the channel enable signal is at an on-level, a channel that supplies a driving current to the backlight pixel and the analog circuit block are turned on, and when the channel enable signal is at an off-level, the channel and the analog circuit block are turned off.

* * * * *